United States Patent

Wong et al.

[11] Patent Number: 5,809,026
[45] Date of Patent: Sep. 15, 1998

[54] MULTI-PORT NETWORK INTERFACE

[75] Inventors: David S. Wong, Campbell; Michael K. Laudon, Monte Sereno, both of Calif.

[73] Assignee: Cypress Semiconductor Corporation, San Jose, Calif.

[21] Appl. No.: 705,688

[22] Filed: Aug. 29, 1996

[51] Int. Cl.⁶ .................................................. H04L 12/413
[52] U.S. Cl. ........................... 370/445; 370/463; 370/239
[58] Field of Search .................................... 370/239, 419, 370/420, 421, 434, 445, 446, 447, 448, 463; 395/200.8

[56] References Cited

U.S. PATENT DOCUMENTS

| | | | |
|---|---|---|---|
| 5,249,183 | 9/1993 | Wong et al. | 370/228 |
| 5,345,447 | 9/1994 | Noel | 370/446 |
| 5,410,535 | 4/1995 | Yang et al. | 395/445 |
| 5,446,735 | 8/1995 | Togabi et al. | 370/445 |
| 5,446,914 | 8/1995 | Paul et al. | 395/200.65 |

*Primary Examiner*—Hassan Kizou
*Assistant Examiner*—Soon-Dong Hyun
*Attorney, Agent, or Firm*—Oblon, Spivak, McClelland, Maier & Neustadt, P.C.

[57] ABSTRACT

A multi-port network interface device including a transmit data bus; a receive data bus; a medium access controller (MAC) and physical signaling (PLS) circuit, coupled to the transmit and receive data buses, and configured to interface to a network layer; at least one transmitter, coupled to the transmit data bus, and configured to transmit data to a physical layer; at least one receiver, coupled to the receive data bus, and configured to receive data from the physical layer; a local collision detector, coupled to the transmit and receive data buses, and configured to detect local collisions on the physical layer; a near end collision detector, coupled to the receive data bus, and configured to detect near end collisions on the physical layer; and a jabber detector, coupled to the transmit data bus, and configured to monitor a length of data transmissions. The at least one receiver is configured to place data, received from the physical layer, on the receive data bus for transmission to the network layer by the MAC and PLS circuit; and the MAC and PLS circuit is configured to place data, received from the network layer, on the transmit data bus for transmission to the physical layer by the at least one transmitter.

15 Claims, 4 Drawing Sheets

MULTI-PORT NETWORK INTERFACE

BACKGROUND OF THE INVENTION

1. Field of the Invention

This invention relates to a device for networking several devices through the same integrated circuit ("IC") and more specifically to a multi-port network interface device which provides a shared communication medium between equipment and headend without the complexity of a repeater.

2. Discussion of Background

The conventional design for multiple port twisted pair applications uses a Medium Access Controller ("MAC"), Physical Signaling ("PLS") and a Physical Medium Attachment ("PMA"), also referred to as Physical Interface ("PHY"), to take data from an OSI reference model network layer and transmit it over a twisted pair medium. The data is then received by a repeater, which retimes the data and broadcasts it over several ports to multiple Network Interface Cards ("NICs").

FIG. 1 is a diagram of the IEEE communications model for Ethernet. The MAC 2 and PLS 4 are coupled to the PMA 8 through the Attachment Unit Interface ("AUI") 6. The PMA 8 connects to the medium 10 which is typically twisted pair.

FIG. 5 shows a conventional design for a multi-port network interface. The MAC and PLS are integrated onto a single MAC/PLS chip 40 which includes a PHY 40a and which connects to a PCI or ISA bus 38 (i.e., OSI reference model network layer) via signals 38a. The MAC/PLS 40 also connects to repeater 42 via a twisted-pair patch cable 41. Repeater 42 connects to NICs 26 via medium 10 which is also typically twisted pair.

The conventional design has a lot of overhead including the patch cable 41 from the MAC/PLS 40 to the repeater 42, and the repeater 42 itself. The conventional design also requires more physical space due to the need for an external repeater 42. The extra space required makes the conventional design less appealing for an environment in which space is limited, such as cable modem set top boxes. In addition, the current IEEE 802.3 specification for Ethernet calls for a single PMA interface for each MAC/PLS device (see FIG. 1).

SUMMARY OF THE INVENTION

Accordingly, one object of this invention is to provide a novel multi-port network interface which integrates a MAC, PLS and multiple Physical Interfaces ("PHYs") onto a single chip significantly reducing the cost of multiple port twisted pair Ethernet and providing a shared communication medium between multiple devices using an Ethernet protocol. The resulting reduction in cost and size will allow market acceptance of devices such as cable modem set top boxes.

It is another object of this invention to provide a novel multi-port network interface which uses both near end and local collision detection and allows for the integration of the repeater functionality with the MAC. The need for an external repeater device is eliminated by the present invention allowing lower cost for connecting several devices. The device also allows multiple Data Terminal Equipment ("DTE") such as printers, personal computers, and other peripheral devices etc. to be connected in a daisy-chain fashion. The resulting reduction in size makes the multiple port twisted pair interface of the present invention more appealing for cable modem set top box applications.

It is yet another object of this invention to provide a novel multi-port network interface which integrates a MAC and PLS with multiple twisted-pair media interfaces, to provide new collision propagation protocols removing the need for a repeater and allowing MAC/PLS integration, and to provide a transmit and receive loopback function to insure correct network operation.

Still another object of the present invention is to provide a novel cable modem set top box which includes a multi-port network interface and allows bi-directional data transfer over coaxial cable with multiple peripheral devices coupled to the multi-port network interface.

The above and other objects are achieved according to the present invention by providing a new and improved multi-port network interface device including a transmit data bus; a receive data bus; a medium access controller (MAC) and physical signaling (PLS) circuit, coupled to the transmit and receive data buses, and configured to interface to a network layer; at least one transmitter, coupled to the transmit data bus, and configured to transmit data to a physical layer; at least one receiver, coupled to the receive data bus, and configured to receive data from the physical layer; a local collision detector, coupled to the transmit and receive data buses, and configured to detect local collisions on the physical layer; a near end collision detector, coupled to the receive data bus, and configured to detect near end collisions on the physical layer; and a jabber detector, coupled to the transmit data bus, and configured to monitor a length of data transmissions. The at least one receiver is configured to place data, received from the physical layer, on the receive data bus for transmission to the network layer by the MAC and PLS circuit; and the MAC and PLS circuit is configured to place data, received from the network layer, on the transmit data bus for transmission to the physical layer by the at least one transmitter.

According a second aspect of the present invention, a cable modem set top box is provided including a multi-port network interface including a transmit data bus, a receive data bus, a medium access controller (MAC) and physical signaling (PLS) circuit, coupled to the transmit and receive data buses, and configured to interface to a network layer, at least one transmitter, coupled to the transmit data bus, and configured to transmit data to a physical layer, at least one receiver, coupled to the receive data bus, and configured to receive data from the physical layer, a local collision detector, coupled to the transmit and receive data buses, and configured to detect local collisions on the physical layer, a near end collision detector, coupled to the receive data bus, and configured to detect near end collisions on the physical layer, and a jabber detector, coupled to the transmit data bus, and configured to monitor a length of data transmissions, wherein the at least one receiver is configured to place data, received from the physical layer, on the receive data bus for transmission to the network layer by the MAC and PLS circuit, and the MAC and PLS circuit is configured to place data, received from the network layer, on the transmit data bus for transmission to the physical layer by the at least one transmitter; a computer bus coupled to the multi-port network interface at the network layer; a microprocessor, coupled to the computer bus, and configured to supervise data transfer to the multi-port network interface over the computer bus; a cable interface, coupled to the microprocessor, and configured to send and receive data over an external cable; wherein the cable interface sends data received over the external cable to the microprocessor which places the received data on the computer bus for transmission by the multi-port network interface to a device coupled to the at least one transmitter, and data received from a device coupled to the at least one receiver is transferred to the microprocessor by the multi-port network interface over the computer bus for transmission by the cable interface over the external cable.

The present invention is ideally suited for cable modem set top boxes, but can be used in many other applications. As many physical interfaces as desired may be integrated to suit the market need for multiple cable modem connections. However, network performance will be degraded as the number of interfaces becomes large.

The multi-port network interface according to the present invention simplifies the design of a multi-port twisted-pair network. The reduction in price when compared to a full twisted pair network will significantly lower the cost of cable modem set top boxes. The present invention can also be used by engineers designing specific proprietary communication systems. Providing a lower cost, more compact design as in the present invention will be essential in future multi-port twisted pair communication applications.

BRIEF DESCRIPTION OF THE DRAWINGS

A more complete appreciation of the invention and many of the attendant advantages thereof will be readily obtained as the same becomes better understood by reference to the following detailed descriptions when considered in connection with the accompanying drawings, wherein.

DESCRIPTION OF THE PREFERRED EMBODIMENTS

Figure 5:
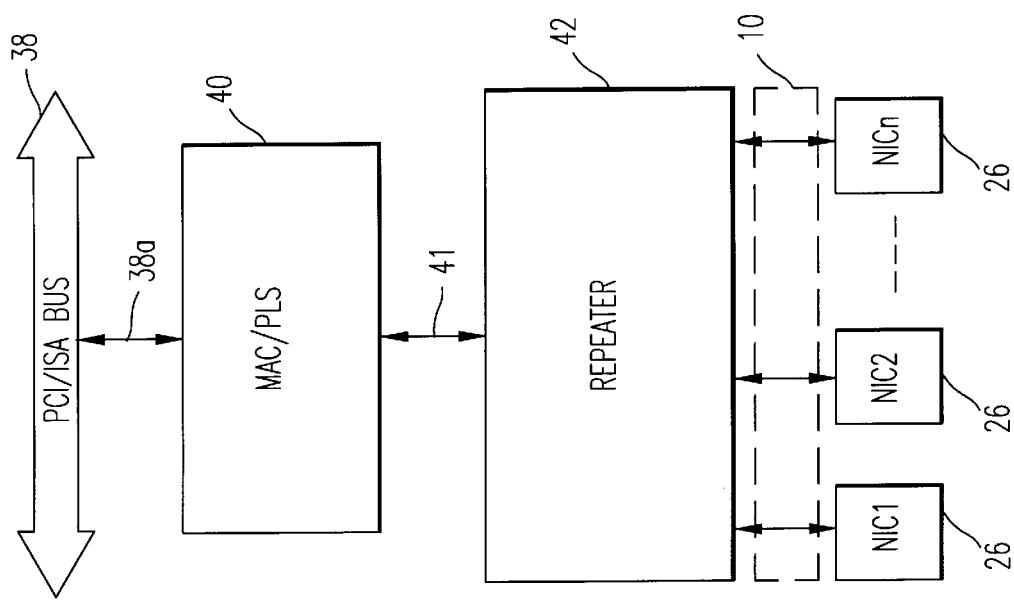
FIG. 5 is a system block diagram of a conventional multi-port network interface.
Figure 1:
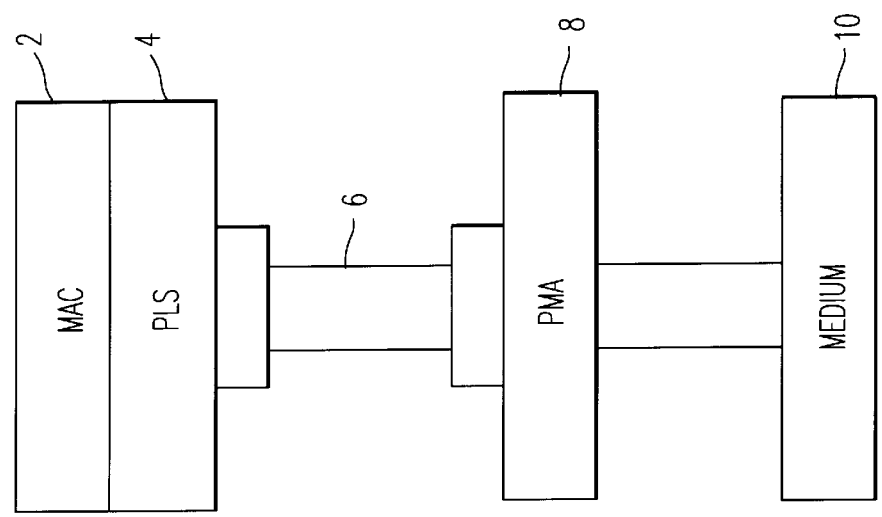
FIG. 1 is a diagram of the IEEE communications model for Ethernet.
Figure 2:
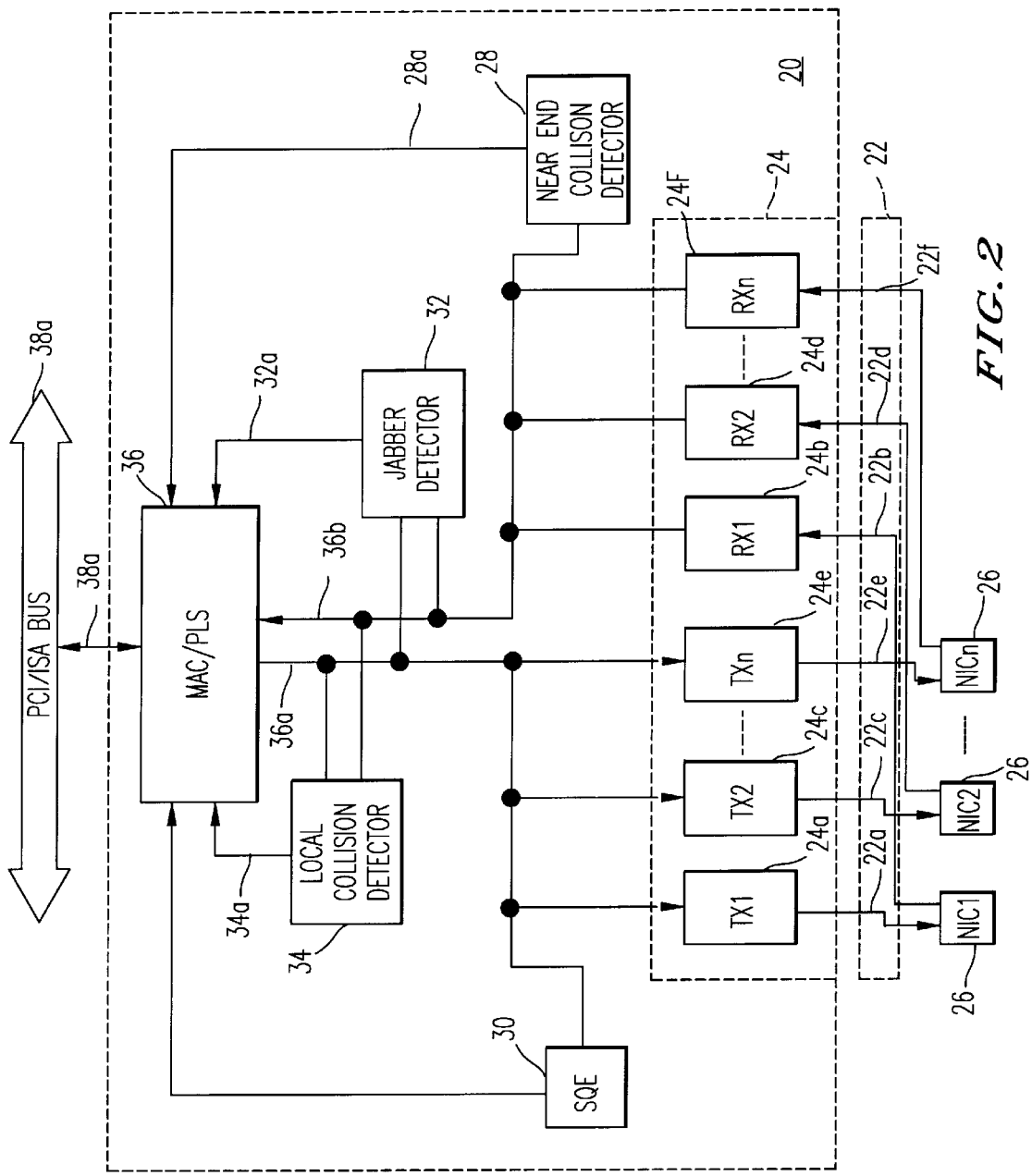
FIG. 2 is a system block diagram of the multi-port network interface according to a first embodiment of the present invention.

Referring now to the drawings, wherein like reference numerals designate identical or corresponding parts throughout the several views, and more particularly to FIGS. 2 thereof, which shows a multi-port network interface IC 20 according to a first embodiment of the present invention including physical transceivers 24 (also referred to as Physical Interfaces ("PHYs")), MAC/PLS 36, local and near end collision detectors 34 and 28, jabber detector 32 and Signal Quality Error ("SQE") circuit 30. Each transmitter and receiver pair make up a physical transceiver (i.e., transmitter 24a and receiver 24b, etc.)

The multi-port network interface IC 20 connects to multiple NICs 26 via physical medium 22 (e.g., twisted-pair). The multi-port network interface IC 20 also communicates with a PCI/ISA bus 38 (i.e., network layer) over signal lines 38a. Data 36a and 36b is sent from and to the MAC/PLS 36, respectively, through the use of a protocol that supervises contention for the multiple physical transceivers 24 on the twisted-pair medium 22 as well as the signal lines 38a connected to the PCI/ISA bus 38 (i.e., network layer).

Figure 3:
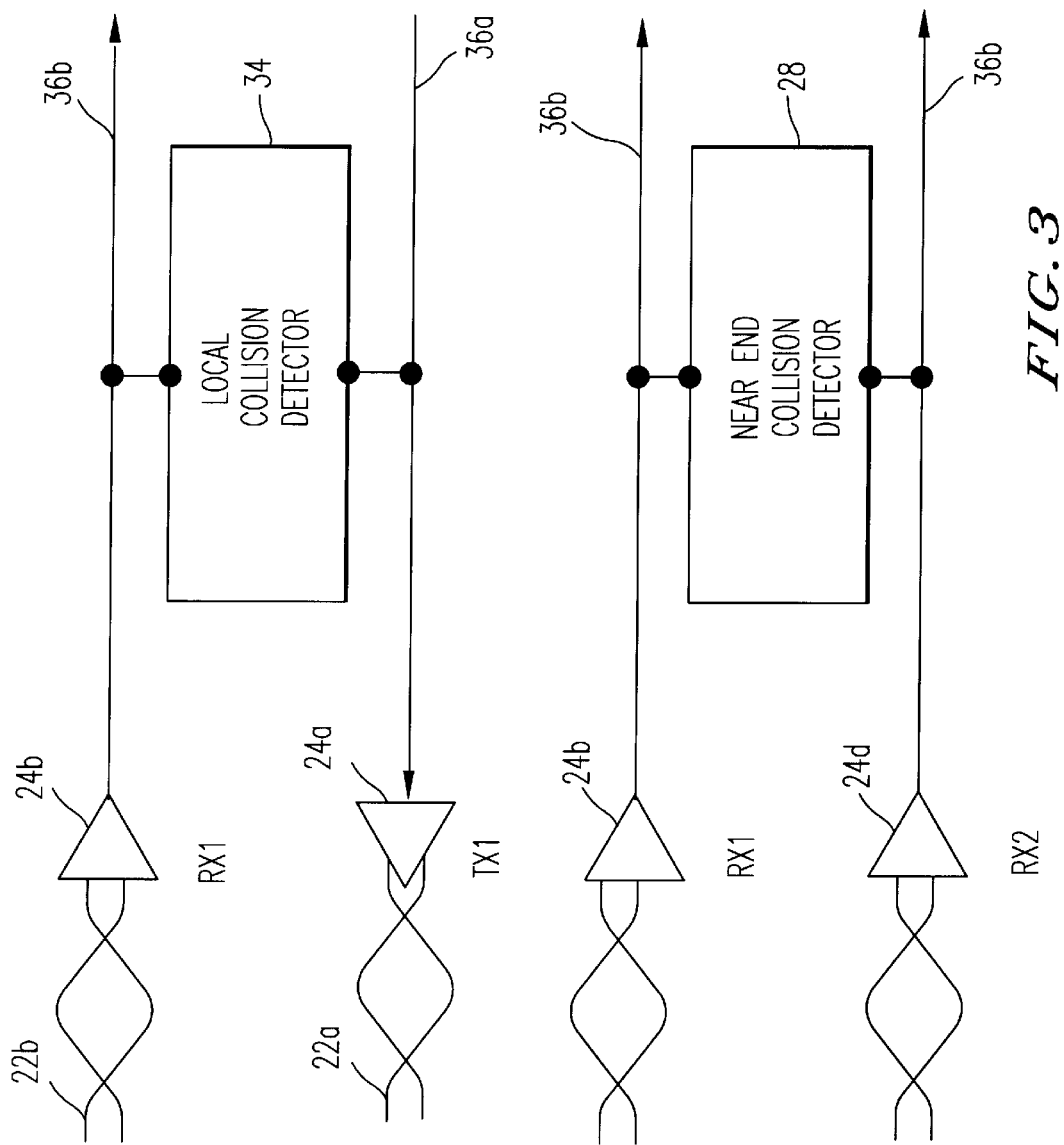
FIG. 3 is a diagram illustrating local and near end collisions in a multi-port network interface.

In FIG. 3, each physical transceiver pair (i.e., transmitter 24a and receiver 24b, etc.) interfaces to a twisted-pair cable connection at the physical layer (i.e., twisted-pair cable 22a and 22b, etc.) The multi-port network interface IC 20 checks for both local and near end collision with local and near end collision detectors 34 and 28, respectively.

Local collisions occur when any one transceiver is both transmitting and receiving at the same time (e.g., receiver 24b is receiving and transmitter 24a is transmitting at the same time). Because transmit data 36a is sent to every transceiver at the same time, whenever data is received on one port while the port is transmitting a collision occurs on that port. This is because IEEE 10 Mb/s twisted-pair Ethernet protocol is half-duplex (i.e., the physical interface can only transmit or receive, but not both).

Near end collisions occur when any two receivers (e.g., receivers 24b and 24d, etc.) are receiving data at the same time. Since all data received is placed on a common bus 36b and sent to the MAC/PLS 36, only one receiver may receive data at any one time since otherwise the received data would become garbled. The multi-port network interface IC 20 is also required to perform transmit and receive jabber control and detection via jabber detector 32, link testing (not shown), Signal Quality Error testing via SQE circuit 30, and both transmit and receive data loopback (not shown).

The function of the present invention is best described by following both a data transmission and reception from when data enters until it leaves the multi-port network interface IC 20 of FIG. 2 as described below.

The MAC/PLS 36 takes data from the PCI/ISA bus 38 via signal limes 38a and, after timing and encoding the data, sends it to each transmitter (i.e., transmitters 24a, 24c and 24e) via transmit data bus 36a. There are several functions which occur during data transmission. The jabber detector 32 monitors the data on transmit data bus 36a to insure that the MAC/PLS 36 does not continuously transmit, monopolizing the physical medium 22. Jabber detector 32 activates a jabber detection signal 32a if the MAC/PLS 36 is transmitting for more than 20 ms. The jabber detection signal 32a is activated within a maximum window limit of 150 ms.

The SQE circuit 30 (optional) sends a signal 30a back to the MAC/PLS 36 after the end of a transmission to confirm successful transceiver execution and proper functioning of the local and near end collision detectors 34 and 28. The transmitted data on transmit data bus 36a is looped back as received data on receive data bus 36b to emulate the coaxial Ethernet loopback function (this is necessary because the MAC/PLS 36 expects the data loopback for proper Ethernet functionality).

The local collision detector 34 monitors the transmit and receive data buses 36a and 36b to insure that data is not being placed on both buses at the same time. When a local collision is detected, the local collision detector 34 notifies the MAC/PLS 36 of the local collision via local collision signal 34a and a JAM signal (not shown) is sent out to all the other ports.

Data is received from the physical medium 22 by the receivers of transceivers 24 (i.e., receivers 24b, 24d and 24f etc.) and sent to the MAC/PLS 36 on the receive data bus 36b. The near end collision detector 34 insures that data is not received from multiple twisted pair connections (i.e., twisted pair connections 22b, 22d and 22f). If data is received on more than one connection at the same time it is disregarded and a JAM signal (not shown) is sent out informing the network a collision has occurred. Data received on receive data bus 36b is looped to every transmitter on transmit data bus 36a except for the transmit partner of the receiver receiving data (e.g., data received by receiver 24b is transmitted to transmitters 24c and 24e but not to transmitter 24a).

Figure 4:
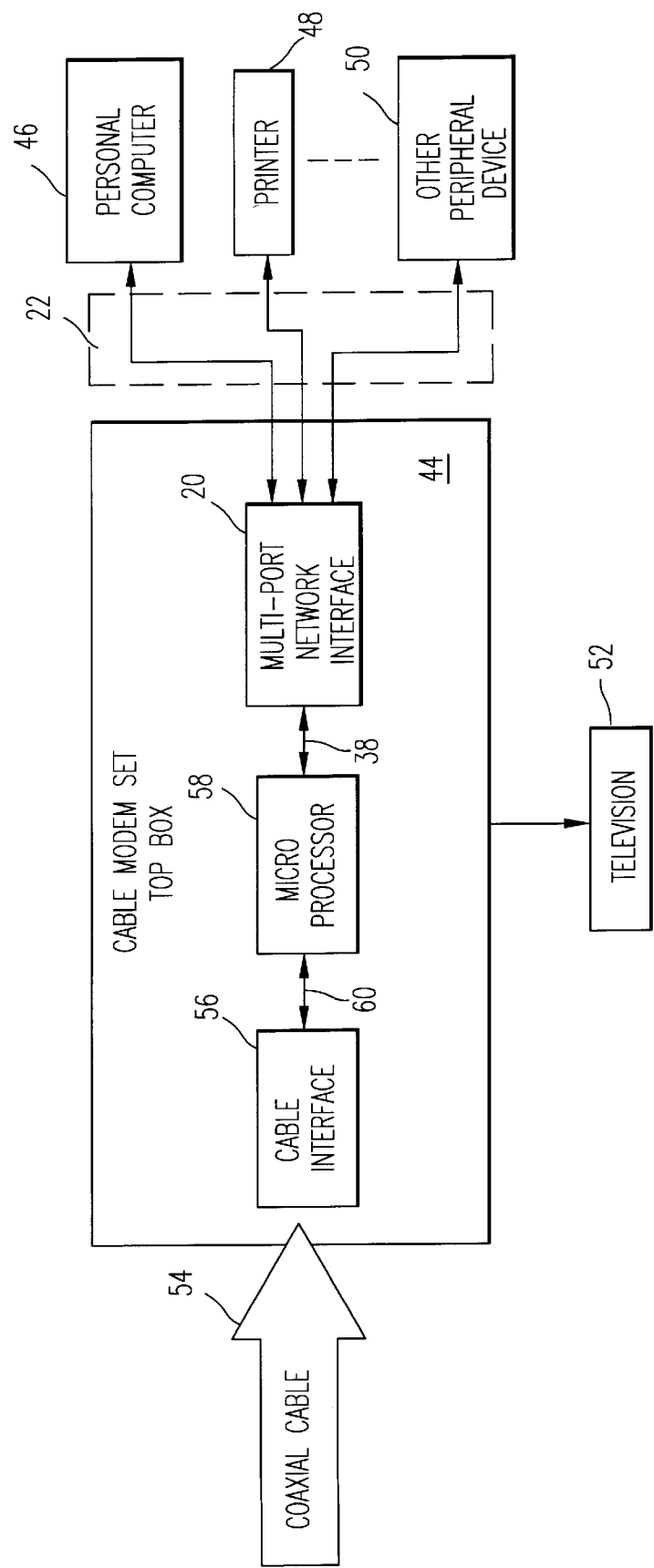
FIG. 4 is a system block diagram of the multi-port network interface used in a cable modem set top box application according to a second embodiment of the present invention.

FIG. 4 is a system block diagram of the multi-port network interface used in a cable modem set top box application according to a second embodiment of the present invention. Bi-directional data is received by cable interface 56 of cable modem set top box 44 over coaxial cable 54 and is transferred to microprocessor 58 over bus 60. Microprocessor 58 supervises the transfer of the bi-directional data to a multi-port network interface 20 over PCI/ISA bus 38. The multi-port network interface 20 takes this bi-directional data and transfers it to devices such as a personal computer 46, printer 48, or other peripheral device 50 over physical medium 22. In this way, bi-directional data can be transmitted to multiple devices attached to the cable modem set top box 44 over coaxial cable 54.

In addition, the cable modem set top box 44 interfaces to conventional cable devices such as a television 52 etc. This is accomplished by using the unused spectrum of data transferred over coaxial cable 54 to transmit bi-directional data to devices coupled to multi-port network interface 20, simultaneously with the data from the portion of the spectrum used to communicate with conventional cable devices such as the television 52.

Although in the first embodiment the multi-port network interface 20 is packaged onto a single IC, this invention may be implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of discrete conventional components or circuits, such as MACs, PLSs, repeaters, transceivers etc., as will be readily apparent to those skilled in the art.

Although the first embodiment of the multi-port network interface 20 is described in terms of providing a network interface via a PCI/ISA bus 38, the present invention could be adapted to interface other bus standards of various types of computers, such as IBM (TM) and Macintosh (TM) personal computers and laptops; SUN (TM), DEC (TM) and HP (TM) workstations; etc. by simply modifying the MAC/PLS 36 functional block to include the appropriate bus interface, as will be apparent to those skilled in the computer art.

Although the second embodiment of the present invention is described in terms of providing cable modem set top box 44, the present invention could be used in other applications where it is desirable to provide an interface to multiple peripheral devices such as network applications, video server applications etc.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A multi-port network interface comprising:
   a transmit data bus;
   a receive data bus;
   a medium access controller (MAC) and physical signaling (PLS) circuit, coupled to the transmit and receive data buses, and configured to interface to a network layer;
   at least one transmitter, coupled to the transmit data bus, and configured to transmit data to a physical layer;
   at least one receiver, coupled to the receive data bus, and configured to receive data from the physical layer;
   a local collision detector, coupled to the transmit and receive data buses, and configured to detect local collisions on the physical layer;
   a near end collision detector, coupled to the receive data bus, and configured to detect near end collisions on the physical layer; and
   a jabber detector, coupled to the transmit data bus, and configured to monitor a length of data transmissions;
   wherein:
      the at least one receiver is configured to place data, received from the physical layer, on the receive data bus for transmission to the network layer by the MAC and PLS circuit; and
      the MAC and PLS circuit is configured to place data, received from the network layer, on the transmit data bus for transmission to the physical layer by the at least one transmitter.

2. The multi-port network interface according to claim 1, further comprising:
   a signal quality error (SQE) circuit, coupled to the transmit data bus, and configured to monitor data transmissions.

3. The multi-port network interface according to claim 2, wherein the MAC and PLS circuit, the at least one transmitter, the at least one receiver, the local collision detector, the near end collision detector, the jabber detector and the SQE circuit are packaged onto a single integrated circuit.

4. The multi-port network interface according to claim 2, wherein the SQE circuit is configured to confirm successful data transmissions on the transmit data bus and confirm that the near end and local collision detectors are not malfunctioning by sending a confirmation signal back to the MAC and PLS circuit.

5. The multi-port network interface according to claim 1, wherein the MAC and PLS circuit, the at least one transmitter, the at least one receiver, the local collision detector, the near end collision detector and the jabber detector are packaged onto a single integrated circuit.

6. The multi-port network interface according to claim 1, wherein the MAC and PLS circuit are configured to implement a transmit and receive loopback function which ensures proper Ethernet functionality.

7. The multi-port network interface according to claim 6, wherein each receiver of the at least one receiver has a transmit partner which is a transmitter of the at least one transmitter, and the loopback function is configured to ensure that data received by a receiver of the at least one receiver is looped to every transmitter of the at least one transmitter except the transmit partner of the receiver receiving the data.

8. The multi-port network interface according to claim 1, further comprising:
   a twisted-pair cable connection coupled to each of the at least one transmitter and the at least one receiver at the physical layer.

9. The multi-port network interface according to claim 1, further comprising:
   a computer bus coupled to the MAC and PLS circuit at the network layer.

10. The multi-port network interface according to claim 9, wherein the computer bus is configured as one of an ISA bus and PCI bus.

11. The multi-port network interface according to claim 1, wherein the jabber detector is configured to monitor the data transmissions on the transmit data bus to ensure that the MAC and PLS circuit does not continuously transmit data on the transmit data bus and thus does not monopolize the physical layer.

12. The multi-port network interface according to claim 1, wherein the local collision detector is configured to monitor the transmit and receive data buses to ensure that a receive and transmit operation are not occurring simultaneously.

13. The multi-port network interface according to claim 1, wherein the near end collision detector is configured to monitor the receive data bus to ensure that data is not received on multiple receivers of the at least one receiver simultaneously.

14. The multi-port network interface according to claim 1, wherein the multi-port network interface is configured to provide a shared communication medium between devices using an Ethernet protocol without the use of a repeater.

15. A cable modem set top box comprising:
 a multi-port network interface, comprising,
  a, transmit data bus,
  a receive data bus,
  a medium access controller (MAC) and physical signaling (PLS) circuit, coupled to the transmit and receive data buses, and configured to interface to a network layer,
  at least one transmitter, coupled to the transmit data bus, and configured to transmit data to a physical layer,
  at least one receiver, coupled to the receive data bus, and configured to receive data from the physical layer,
  a local collision detector, coupled to the transmit and receive data buses, and configured to detect local collisions on the physical layer,
  a near end collision detector, coupled to the receive data bus, and configured to detect near end collisions on the physical layer, and
  a jabber detector, coupled to the transmit data bus, and configured to monitor a length of data transmissions, wherein:
   the at least one receiver is configured to place data, received from the physical layer, on the receive data bus for transmission to the network layer by the MAC and PLS circuit, and
   the MAC and PLS circuit is configured to place data, received from the network layer, on the transmit data bus for transmission to the physical layer by the at least one transmitter;
 a computer bus coupled to the multi-port network interface at the network layer;
 a microprocessor, coupled to the computer bus, and configured to supervise data transfer to the multi-port network interface over the computer bus;
 a cable interface, coupled to the microprocessor, and configured to send and receive data over an external cable;
 wherein the cable interface sends data received over the external cable to the microprocessor which places the received data on the computer bus for transmission by the multi-port network interface to a device coupled to the at least one transmitter, and data received from a device coupled to the at least one receiver is transferred to the microprocessor by the multi-port network interface over the computer bus for transmission by the cable interface over the external cable.

\* \* \* \* \*